(12) United States Patent
Mason et al.

(10) Patent No.: US 6,249,753 B1
(45) Date of Patent: Jun. 19, 2001

(54) SENSOR SIGNAL CONDITIONER WITH CALIBRATION

(75) Inventors: Robert C. Mason; Rodney B. Washington, both of Raleigh, NC (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/222,615

(22) Filed: Dec. 29, 1998

(51) Int. Cl.$^7$ .............................. G01D 18/00; H03M 1/00
(52) U.S. Cl. ........................ 702/104; 702/87; 702/107; 340/501; 341/155
(58) Field of Search .............................. 702/86–87, 104, 702/107, 189; 341/110, 118, 120–121, 155; 340/501, 515, 517; 73/1.88, 763, 765

(56) References Cited

U.S. PATENT DOCUMENTS

| | | | |
|---|---|---|---|
| 4,800,513 | * | 1/1989 | Deutsch ................. 702/107 |
| 5,479,096 | * | 12/1995 | Szczyrbak et al. ............ 702/104 |
| 5,798,692 | * | 8/1998 | Crispie et al. ............ 340/501 |
| 5,995,033 | * | 11/1999 | Roeckner et al. ............ 341/155 |
| 6,013,108 | * | 1/2000 | Karolys et al. ............ 702/189 |

OTHER PUBLICATIONS

Information from MAXIM—1%–Accurate, Digitally Trimmed Sensor Signal Conditioner.

* cited by examiner

*Primary Examiner*—Kamini Shah
*Assistant Examiner*—Bryan Bui
(74) *Attorney, Agent, or Firm*—David Russell Stacey; Larry T. Shrout; Larry I. Golden

(57) ABSTRACT

A sensor system is disclosed. The system comprises a sensor for sensing an input between a first, minimum sensor input value and a second, maximum sensor input value. The sensor generates a sensor output signal relative to the sensor input value. The sensor is subject to offset and gain errors. The system further includes a microprocessor having first and second output signals and a signal conditioner coupled between the sensor and the microprocessor. The signal conditioner generates a first signal conditioner signal when the sensor input value equals the minimum sensor input value and generates a maximum signal conditioner signal when the sensor input value equals the maximum sensor input value. The signal conditioner includes circuitry for minimizing the sensor offset error and circuitry for minimizing the sensor gain error. The offset minimizing circuitry includes circuitry responsive to the first microprocessor signal for generating a signal substantially equal to zero when the sensor input value is at the minimum sensor value. The gain error minimizing circuit includes circuitry responsive to the second microprocessor signal for generating a signal substantially equal to the maximum signal conditioner value when the sensor input is at the maximum sensor value.

16 Claims, 3 Drawing Sheets

SENSOR SIGNAL CONDITIONER WITH CALIBRATION

TECHNICAL FIELD

The invention relates to a sensors, such as pressure transducers, and more particularly to a sensor having improved calibration.

BACKGROUND OF THE INVENTION

Modem sensing systems typically include a sensor, a microprocessor, and an A/D converter coupled there between. Sensors typically provide a low-level signal which needs to be amplified before being of use. Major error sources in such a system include offset error and gain error.

Offset error calibration of the sensor can be done by applying a zero input to the sensor and reading the resulting value output from an A/D converter. If the offset error is small, the processor may simply add or subtract that value from the signal to arrive at a compensated value. Doing this with a large offset error, however, can result in the loss of almost half of the A/D converter's resolution. Thus it is desired to output a signal from the processor, pass it through a D/A converter and counter-act the offset error within the signal conditioning circuit. This allows the full resolution of the A/D converter to be used for signal values. This also compensates for any offset errors occurring in the signal conditioning circuit itself, another point of concern.

To get best resolution, a full scale input into the sensor should result in a full scale output reading from the A/D converter. Since the sensor's full scale output can vary from unit to unit, some means for adjusting the circuit's gain is needed.

Gain calibration can be done by applying a full scale input to the sensor after offset calibration is complete. The gain of the circuit is adjusted until the out put of the A/D converterjust reaches a full scale reading. At this point the whole signal path is calibrated for gain and offset.

The offset null and gain control signals can compensate for errors occurring anywhere in the entire signal path from the sensor to the output of the A/D converter. Once the system is calibrated, the values of the necessary adjustments are stored in the microprocessor's non-volatile memory for recall after every power-up sequence. If the system is such that the output of the sensor is known to be zero immediately after power up, offset calibration may be performed automatically at every power up time and the offset null adjustment value would not need to be stored in non-volatile memory.

SUMMARY OF THE INVENTION

It is an object of the invention to provide a signal conditioner for a sensor system.

The sensor system includes a sensor for sensing an input between a first, minimum value and a second, maximum value. The sensor generates a sensor signal relative to the sensor input. The sensor is subject to offset and gain errors. The sensor system further includes a microprocessor having first and second microprocessor output signals. The signal conditioner calibrates the sensor output signal.

In accordance with the invention, the signal conditioner comprises means responsive to the sensor output signal and the first microprocessor signal for generating a null signal. The null signal is substantially equal to zero when the sensor input is at the minimum sensor value. The signal conditioner further comprises means responsive to the null signal and the second microprocessor signal for generating a gain signal substantially equal to the maximum signal conditioner value when the sensor input is at the maximum sensor value.

It is contemplated that the null signal generating means includes a summing circuit for summing the sensor output signal and the first microprocessor signal.

It is further contemplated that the gain signal generating means includes a frequency controlled amplifier.

It is a further object of the invention to provide a method of providing a calibrated sensor signal substantially free of offset and null errors.

The sensor senses an input between a first, minimum value and a second, maximum value. The sensor generates a sensor output signal relative to the sensor input value.

In accordance with the invention, the method includes providing a microprocessor having first and second output signals, and providing a signal conditioner including means responsive to the sensor output signal and the first microprocessor signal for generating a null signal, and means responsive to the null signal and the second microprocessor signal for generating a gain signal. The sensor input value is set to zero and the first microprocessor signal is adjusted until the null signal equals zero. In addition, the sensor input value is set to the maximum value and the second microprocessor signal is adjusted until the signal conditioner signal equals the maximum value.

Other features and advantages of the invention will be apparent from the following specification taken in conjunction with the following drawings.

DETAILED DESCRIPTION

Figure 1:
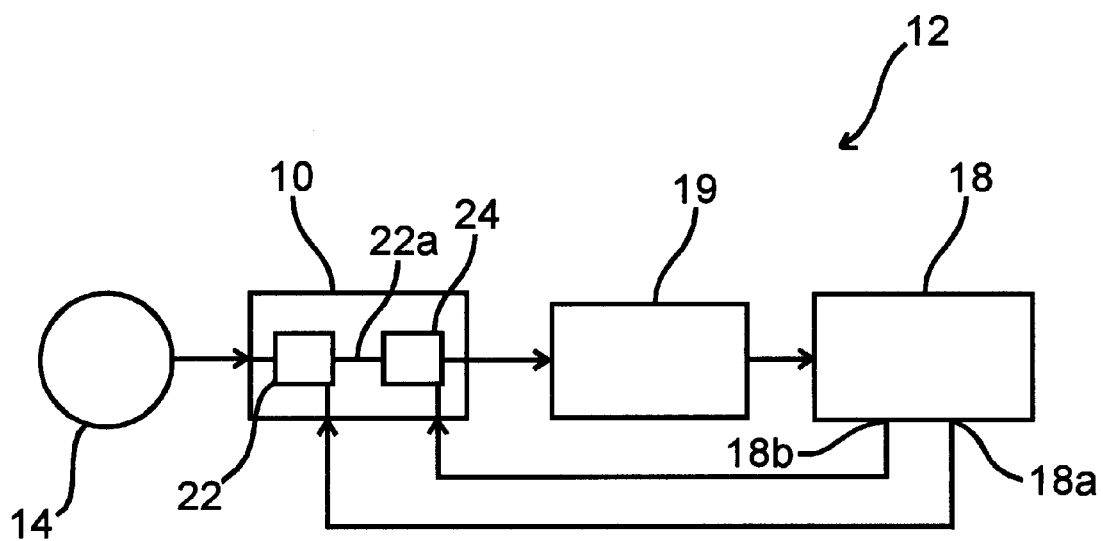
FIG. 1 is a block diagram of a sensor system in accordance with the invention.

While this invention is susceptible of embodiment in many different forms, there is shown in the drawings and will herein be described in detail, a preferred embodiment of the invention, with the understanding that the present disclosure is to be considered as an exemplification of the principles of the invention and is not intended to limit the broad aspect of the invention to the embodiment illustrated.

A signal conditioner 10, for a sensor system, generally designated 12, is illustrated in FIG. 1.

The sensor system 12 includes a sensor 14. The sensor 14 may, for example, be a pressure sensor. The sensor 14 senses an input between a first, minimum value, such as zero pressure, and a second, maxiimum value. The sensor 14 generates an analog sensor signal having a magnitude relative to the magnitude of the sensor input. As is typical with sensors in general, the sensor 14 is subject to offset and gain errors.

The sensor system 12 further includes a microprocessor 18 having first and second outputs 18a, 18b. The first and second outputs 18a, 18b, generate respective first and second microprocessor output signals. An A/D converter 19 is disposed between the sensor 14 and the microprocessor 18. As discussed below, the signal conditioner 10 calibrates the sensor output signal, to minimize, or otherwise eliminate, offset and gain errors.

The signal conditioner 10 includes offset correction circuitry 22 responsive to the sensor output signal and the first microprocessor signal for generating a null signal. The null signal is substantially equal to zero when the sensor input is at the minimum sensor value. The signal conditioner 10 further includes gain correction circuitry 24 responsive to the null signal and the second microprocessor signal for generating a gain signal substantially equal to the maximum signal conditioner value when the sensor input is at the maximum sensor value.

Figure 2:
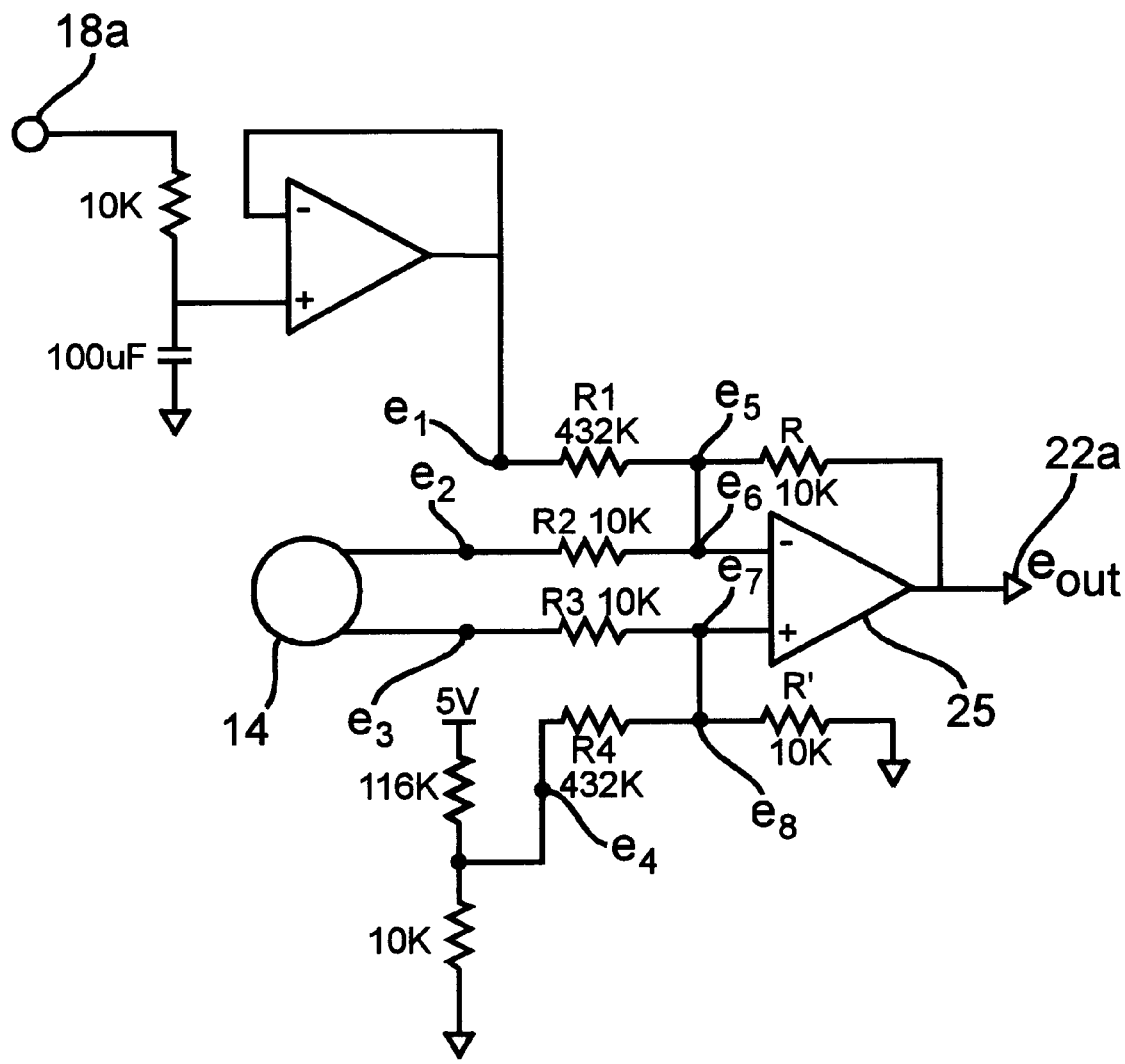
FIG. 2 is a schematic diagram of offset error correction circuitry in accordance with the invention.

The offset correction circuitry 22 is illustrated in FIG. 2. The offset correction circuitry generally includes a summing circuit for summing the sensor output signal and the first microprocessor signal. The offset correction circuitry 22 takes a differential output from the sensor 14, nulls any sensor offset voltages, in cooperation with the processor 18, and presents a single-ended nulled output 22 $a$ (e out) to the gain correction circuitry 24. The gain correction circuitry 24 amplifies the signal to the correct level to present to the A/D converter 19.

The offset correction circuitry 22 is based on an operational amplifier (or, op-amp) non-inverting adder/subtractor. This circuit was taken from Philbrick/Nexus Research "Applications Manual for Operational Amplifiers, Second Printing", February, 1968. The offset correction circuitry 22 includes an op amp 25. The output of the sensor 14 is coupled to the op amp 25 via resistors R2 and R3. The offset null voltage 18$a$ is injected via resistor R1, which is subtracted from the sensor voltage. If a negative offset anywhere in the system must be nulled by a positive offset adjustment, a connection via resistor R4 is used. If no positive offset adjustment is required, resistor R4 may be grounded, or eliminated entirely.

For purposes of explaining operation of the offset correction circuitry 22, consider voltages e1, e2, e3, e4, e5, e6, e7 and e8, as shown in FIG. 2. The ratio of the voltage e1 to the voltage e5 is equal to the ratio of the resistance R to the resistance R1, assuming, for now, that e2, e3 and e4 are all equal to zero. This ratio is referred to as the K factor, and in the present case, K1 equals 10k/432k, or 0.023. The corresponding K factors are K2=R/R2; K3=R'/R3; and K4=R'/R4. If K1+K2 =K3 +K4, then the output of this circuit eout is equal to K3e3+K4e4-(K1e1+K2e2). If the resistor $R_4$ is eliminated, care must be taken to maintain the required balance of remaining K factors.

In this design, the op amp 25 used can have as much as +/−9 mV of offset. If the offset is positive, it will be nulled by the voltage via the resistor $R_1$. However, if the offset voltage is negative, voltage must be applied via the resistor $R_4$. To provide a single offset adjustment in the calibration, a voltage of +9mV/K4 is fixed to the positive summing point via the resistor $R_4$. This voltage nulls a worst case negative offset in the op amp 25. Anything less than a worst case negative offset would then appear as a positive offset of from 0 to 18 mV. This could be handled by the offset null voltage from the processor.

The offset adjustment is driven from output 18$a$ of the microprocessor 18. Microprocessors are good at providing accurate timing signals. In this case, the processor 18 outputs a pulse width modulated, or PWM, signal at 18$a$, whose duty cycle is proportional to the desired offset voltage. The PWM signal is filtered to produce the offset voltage. The filtered output voltage is applied via the resistor $R_1$, where it is then applied to the sumning point as scaled by the K4 factor of the adder/subtractor circuit. While the output of the PWM filter will have some remaining ripple, that ripple will also be reduced by the K4 factor. In the present example, K4 is 0.023.

Another alternative would be to output a multi-bit offset adjustment value and use it to drive a conventional D/A converter to create the adjustment voltage.

Figure 3:
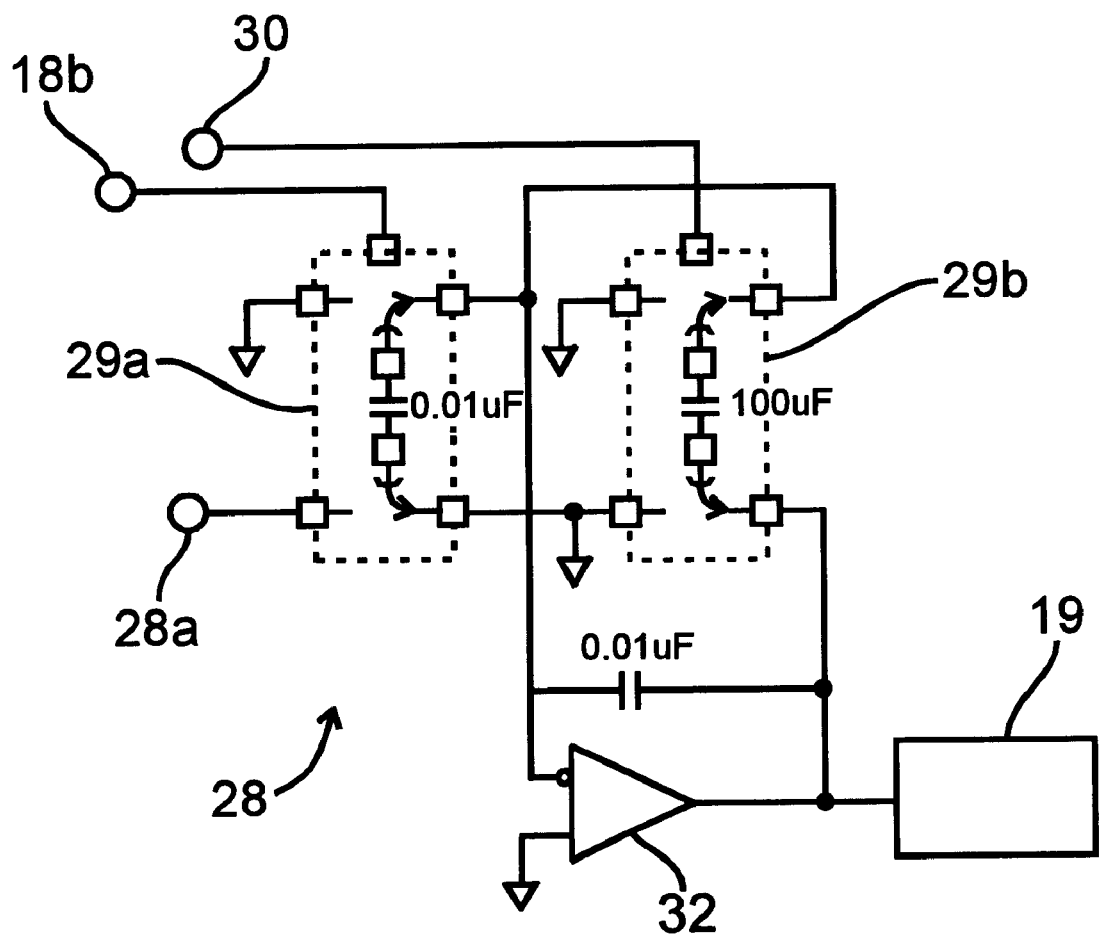
FIG. 3 is a schematic diagram of gain error correction circuitry in accordance with the invention.

The gain correction circuitry 24 is illustrated in FIG. 3, and generally includes a frequency controlled amplifier 28. The frequency controlled amplifier has an input 28$a$ coupled to the eout output 22$a$ (nulled output) of the offset correction circuitry 22, discussed above. The frequency controlled amplifier 28 generally includes first and second switched capacitor devices 29$a$, 29$b$. The first and second switched capacitor devices 29$a$, 29$b$, can be commercially available LTC 1043 devices from Linear Technology, or similar switched capacitor devices. The frequency controlled amplifier 28 further includes an operational amplifier 32.

A 1 kHz clock signal is provided by a clock 30, typically provided by the microprocessor 18. The second microprocessor signal 18$b$ is a variable frequency, gain control signal. The gain G of the gain control circuitry 24 is equal to the frequency of the clock signal (Fin), divided by a factor of ten, times the ratio of capacitor C1 and capacitor C2. Gain can vary from 0 to 1000 for a Fin ranging from 0 to 10 KHz. One could also vary the frequency of both the gain control signal and 1 kHZ clock signal in order to obtain a gain value which might not be achievable by varying the gain control signal alone. In that case the gain equation changes, of course, but a trial and error algorithm will work since this is a closed system, i.e., frequencies may be adjusted until the desired gain is achieved.

Giving the microprocessor 18 the ability to control the gain of the signal conditioning circuit 10 has several advantages. One is being able to calibrate the circuit to the gain needed by a particular sensor and component tolerances of the circuit without any variable resistors or similar devices. This gain calibration compensates for all gain variables in the signal path, from the sensor through the offset null and gain stages and out of the A/D converter.

The second advantage is that the gain may be set to a very high value during the offset calibration procedure. That will magnify any offset voltage which is present and, coupled with the offset nulling circuit, result in a very accurate determination that the required offset null voltage has been obtained.

The third advantage is the ability to calibrate out component tolerances affecting the gain of the overall system. For example, the gain of the amplifier depends on the ratio of two frequencies and the ratio of two capacitors. Both of the frequencies come from the same microprocessor; thus they are crystal-controlled and will be very stable with respect to each other. The capacitors, however, are two discrete devices, each having its own initial tolerance. That can result in significant deviation from the desired gain figure. The gain calibration process described earlier will adjust for any gain error stemming from non-exact capacitor values. Once one compensates for initial tolerances, changes in capacitor value due to operating conditions, such as temperature, will tend to cancel out, since the key value is a ratio. Best performance will be seen when both capacitors have the same dielectric type and construction. Linear Technology suggests that the gain stability would typically be 20 ppm/° C. when polystyrene capacitors are used.

The fourth advantage is found when the signal being measured is significantly less than the full scale of the A/D converter. Once the processor determines that the sensor is less than half of the full scale value, it can double the gain control frequency and read the resulting value from the A/D converter. This means greater resolution of small signals. If the A/D converter has 8 bit resolution, for example, signals less than half of fill scale can be measured to 9 bit resolution. Extending this concept further, signals less than ¼ of full scale can be measured to 10 bit resolution, and so on, to the limits of accuracy of the signal conditioning circuits and the sensor itself. This makes it possible to detect some smaller changes in conditions which the basic 8 bit A/D converter would not be able handle.

For example, an eight bit A/D converter has 256 possible output values. If the full scale value is 5 volts, the smallest change the converter can report is 5/256=19.5 mV. If the converter has 10 bits of resolution, the smallest change it can report is 5/1024=4.9 mV. If a change of 5 mV on a signal of less than 1.2 volts is important, the fixed resolution eight bit converter could miss it entirely.

The sensor 14 is calibrated as follows. The sensor input value is set to zero, and the duty cycle of the first microprocessor signal is adjusted until the null signal equals zero. Subsequently, the sensor input value is set to the maximum value, and the frequency of the second microprocessor signal is adjusted until the signal conditioner signal equals the maximum value. Thus, at this point, an input to the sensor 14 of zero magnitude will result in an output from the signal conditioner of zero. Additionally, an input to the sensor 14 of maximum magnitude will result in an output from the signal conditioner of maximum value.

While the specific embodiments have been illustrated and described, numerous modifications come to mind without significantly departing from the spirit of the invention and the scope of protection is only limited by the scope of the accompanying claims.

We claim:

1. A sensor system comprising:
   a sensor for sensing an input between a first, minimum sensor input value and a second, maximum sensor input value, said sensor generating a sensor output signal relative to said sensor input value, said sensor subject to offset and gain errors;
   a microprocessor having first and second outputs generating respective first and second microprocessor signals;
   a signal conditioner coupled between said sensor and said microprocessor, said signal conditioner generating a first signal conditioner signal when said sensor input value equals said minimum sensor input value and generating a second signal conditioner signal when said sensor input value equals said maximum sensor input value, said signal conditioner including means for minimizing said sensor offset error and means for minimizing said sensor gain error, wherein said offset minimizing means includes a summing circuit for summing said sensor output signal and said first microprocessor signal to generate a summed signal substantially equal to zero when said sensor input value is at said minimum sensor value, and said gain error minimizing means includes a variable gain amplifier responsive to said summed signal and said second microprocessor signal for generating a signal substantially equal to said maximum sensor value when said sensor input value is at said maximum sensor value.

2. The sensor system of claim 1 wherein said first microprocessor signal is a pulse width modulated signal.

3. The sensor system of claim 2, wherein said summing circuit includes means for converting said first microprocessor signal to a substantially dc signal.

4. The sensor system of claim 1 wherein said variable gain amplifier is a frequency controlled amplifier.

5. The sensor system of claim 1 including an A/D converter coupled between said signal conditioner and said microprocessor.

6. For a sensor system including:
   a sensor for sensing an input between a first, minimum value and a second, maximum value, said sensor generating a sensor signal relative to said sensor input, said sensor being subject to offset and gain errors: and
   a microprocessor having first and second microprocessor output signals;
   a signal conditioner for calibrating the sensor output signal, the signal conditioner comprising:
      means for generating a null signal responsive to said sensor output signal and said first microprocessor signal, wherein said null signal is substantially equal to zero when said sensor input is at said minimum sensor value; and
      means for for generating a gain signal responsive to said null signal and said second microprocessor signal, wherein said gain signal is substantially equal to said maximum signal conditioner value when said sensor input is at said maximum sensor value.

7. The sensor of claim 6 wherein said null signal generating means includes a summing circuit for summing said sensor output signal and said first microprocessor signal.

8. The sensor of claim 6 wherein said gain signal generating means includes a frequency controlled amplifier.

9. A sensor calibration circuit comprising:
   a sensor for sensing an input between a first, minimum sensor input value and a second, maximum sensor input value, said sensor generating a sensor output signal relative to said sensor input value, said sensor subject to offset and gain errors;
   a microprocessor having first and second outputs generating respective first and second microprocessor signals;
   a signal conditioner coupled between said sensor and said microprocessor, said signal conditioner generating a first signal conditioner signal when said sensor input value equals said minimum sensor input value and generating a second signal conditioner signal when said sensor input value equals said maximum sensor input value, said signal conditioner including means for minimizing said sensor offset error and means for minimizing said sensor gain error, wherein said offset minimizing means includes a summing circuit for summing said sensor output signal and said first microprocessor signal to generate a summed signal substantially equal to zero when said sensor input value is at said minimum sensor value, and said gain error minimizing means includes a variable gain amplifier responsive to said summed signal, said second microprocessor signal and a clock signal for generating a signal substantially equal to said maximum sensor value when said sensor input value is at said maximum sensor value.

10. The sensor calibration circuit of claim 9, wherein said first microprocessor signal is a pulse width modulated signal.

11. The sensor calibration circuit of claim 9, wherein said first microprocessor signal is electrically positive.

12. The sensor calibration circuit of claim 9, wherein said second microprocessor signal is a variable frequency.

13. The sensor calibration circuit of claim 9, wherein said summing circuit includes means for converting said first microprocessor signal to a substantially dc signal.

14. The sensor calibration circuit of claim 9, wherein said clock signal can be provided by said microprocessor.

15. The sensor calibration circuit of claim 9, further includes an analog to digital converter receiving an output signal from said variable gain amplifier and providing an input signal to said microprocessor thereby causing said sensor calibration circuit to be a closed loop calibration circuit.

16. A method of calibrating a sensor output signal such that the sensor output signal is substantially free of offset and gain errors, the calibration method comprising:

generating first and second microprocessor output signals;

summing the sensor output signal and said first microprocessor signal;

generating a calibrated null signal by setting the sensor input value to zero and adjusting said first microprocessor signal until said calibrated null signal is generally equal to zero;

summing said calibrated null signal and said second microprocessor signal;

generating a calibrated gain signal by setting the sensor input to a maximum value and adjusting said second microprocessor signal until said calibrated gain signal equals said maximum value.

* * * * *